United States Patent
Lin et al.

(10) Patent No.: US 10,573,076 B2
(45) Date of Patent: Feb. 25, 2020

(54) METHOD AND APPARATUS FOR GENERATING AND ENCODING PROJECTION-BASED FRAME WITH 360-DEGREE CONTENT REPRESENTED BY RECTANGULAR PROJECTION FACES PACKED IN VIEWPORT-BASED CUBE PROJECTION LAYOUT

(71) Applicant: MEDIATEK INC., Hsin-Chu (TW)

(72) Inventors: Hung-Chih Lin, Nantou County (TW); Chia-Ying Li, Taipei (TW); Le Shi, Beijing (CN); Ya-Hsuan Lee, New Taipei (TW); Jian-Liang Lin, Yilan County (TW); Shen-Kai Chang, Hsinchu County (TW)

(73) Assignee: MEDIATEK INC., Hsin-Chu (TW)

(*) Notice: Subject to any disclaimer, the term of this patent is extended or adjusted under 35 U.S.C. 154(b) by 141 days.

(21) Appl. No.: 15/839,799

(22) Filed: Dec. 12, 2017

(65) Prior Publication Data
US 2018/0165886 A1    Jun. 14, 2018

Related U.S. Application Data

(60) Provisional application No. 62/433,858, filed on Dec. 14, 2016, provisional application No. 62/445,809, filed on Jan. 13, 2017.

(30) Foreign Application Priority Data

Dec. 11, 2017    (WO) ................ PCT/CN2017/115383

(51) Int. Cl.
*G06T 19/00*    (2011.01)
*G06T 3/00*    (2006.01)
(Continued)

(52) U.S. Cl.
CPC ............ *G06T 19/006* (2013.01); *G06T 3/005* (2013.01); *G06T 9/00* (2013.01); *G06T 15/205* (2013.01); *G06T 19/00* (2013.01); *G02B 27/017* (2013.01)

(58) Field of Classification Search
None
See application file for complete search history.

(56) References Cited

U.S. PATENT DOCUMENTS

| | | | |
|---|---|---|---|
| 2004/0105597 A1 | 6/2004 | Lelescu | |
| 2017/0339416 A1* | 11/2017 | Hendry | ................ H04N 19/167 |
| 2019/0166382 A1* | 5/2019 | He | ....................... H04N 19/597 |

FOREIGN PATENT DOCUMENTS

| | | |
|---|---|---|
| CN | 105898254 A | 8/2016 |
| CN | 106056531 A | 10/2016 |

(Continued)

OTHER PUBLICATIONS

"International Search Report" dated Feb. 26, 2018 for International application No. PCT/CN2017/115383, International filing date:Dec. 11, 2017.

*Primary Examiner* — Leon Viet Q Nguyen
(74) *Attorney, Agent, or Firm* — Winston Hsu

(57) ABSTRACT

A video processing method includes: receiving an omnidirectional image/video content corresponding to a viewing sphere, generating a sequence of projection-based frames according to the omnidirectional image/video content and a viewport-based cube projection layout, and encoding the sequence of projection-based frames to generate a bitstream. Each projection-based frame has a 360-degree image/video content represented by rectangular projection faces packed in the viewport-based cube projection layout. The rectangular projection faces include a first rectangular projection face, a second rectangular projection face, a third rectangular projection face, a fourth rectangular projection face, a (Continued)

fifth rectangular projection face, and a sixth rectangular projection face split into partial rectangular projection faces. The first rectangular projection face corresponds to user's viewport, and is enclosed by a surrounding area composed of the second rectangular projection face, the third rectangular projection face, the fourth rectangular projection face, the fifth rectangular projection face, and the partial rectangular projection faces.

22 Claims, 6 Drawing Sheets

(51) Int. Cl.
*G06T 15/20* (2011.01)
*G06T 9/00* (2006.01)
*G02B 27/01* (2006.01)

(56) References Cited

FOREIGN PATENT DOCUMENTS

| | | |
|---|---|---|
| CN | 106162139 A | 11/2016 |
| CN | 106162207 A | 11/2016 |
| WO | 2016/140083 A1 | 9/2016 |

* cited by examiner

METHOD AND APPARATUS FOR GENERATING AND ENCODING PROJECTION-BASED FRAME WITH 360-DEGREE CONTENT REPRESENTED BY RECTANGULAR PROJECTION FACES PACKED IN VIEWPORT-BASED CUBE PROJECTION LAYOUT

CROSS REFERENCE TO RELATED APPLICATIONS

This application claims the benefit of U.S. provisional application No. 62/433,858 filed Dec. 14, 2016 and U.S. provisional application No. 62/445,809 filed Jan. 13, 2017, which are incorporated herein by reference.

BACKGROUND

The present invention relates to processing omnidirectional image/video contents, and more particularly, to a method and an apparatus for generating and encoding a projection-based frame with a 360-degree content (e.g., 360-degree image content or 360-degree video content) represented by rectangular projection faces packed in a compact viewport-based cube projection layout.

Virtual reality (VR) with head-mounted displays (HMDs) is associated with a variety of applications. The ability to show wide field of view content to a user can be used to provide immersive visual experiences. A real-world environment has to be captured in all directions resulting in an omnidirectional image/video content corresponding to a viewing sphere. With advances in camera rigs and HMDs, the delivery of VR content may soon become the bottleneck due to the high bitrate required for representing such a 360-degree image/video content. When the resolution of the omnidirectional video is 4K or higher, data compression/encoding is critical to bitrate reduction.

SUMMARY

One of the objectives of the claimed invention is to provide a method and an apparatus for generating and encoding a projection-based frame with a 360-degree content (e.g., 360-degree image content or 360-degree video content) represented by rectangular projection faces packed in a compact viewport-based cube projection layout. With a proper design of the viewport-based cube projection layout, the projection-based frame can have a compact form, and/or the image content of the user's viewport (i.e., a viewport area) can be preserved in a main projection face (e.g., a central rectangular projection face).

According to a first aspect of the present invention, an exemplary video processing method is disclosed. The exemplary video processing method includes: receiving an omnidirectional image/video content corresponding to a viewing sphere, generating a sequence of projection-based frames according to the omnidirectional image/video content and a viewport-based cube projection layout, and encoding, by a video encoder, the sequence of projection-based frames to generate a bitstream. Each projection-based frame has a 360-degree image/video content represented by rectangular projection faces packed in the viewport-based cube projection layout. The viewport-based cube projection layout comprises a first rectangular projection face, a second rectangular projection face, a third rectangular projection face, a fourth rectangular projection face, a fifth rectangular projection face and a sixth rectangular projection face that is split into partial rectangular projection faces (e.g., four partial rectangular projection faces). The first rectangular projection face corresponds to a user's viewport, and is enclosed by a surrounding area composed of the second rectangular projection face, the third rectangular projection face, the fourth rectangular projection face, the fifth rectangular projection face, and the partial rectangular projection faces (e.g., four partial rectangular projection faces).

According to a second aspect of the present invention, an exemplary video processing apparatus is disclosed. The exemplary video processing apparatus includes a conversion circuit and a video encoder. The conversion circuit is arranged to receive an omnidirectional image/video content corresponding to a viewing sphere, and generate a sequence of projection-based frames according to the omnidirectional image/video content and a viewport-based cube projection layout, wherein each projection-based frame has a 360-degree image/video content represented by rectangular projection faces packed in the viewport-based cube projection layout. The viewport-based cube projection layout comprises a first rectangular projection face, a second rectangular projection face, a third rectangular projection face, a fourth rectangular projection face, a fifth rectangular projection face and a sixth rectangular projection face that is split into partial rectangular projection faces (e.g., four partial rectangular projection faces). The first rectangular projection face corresponds to a user's viewport and is enclosed by a surrounding area composed of the second rectangular projection face, the third rectangular projection face, the fourth rectangular projection face, the fifth rectangular projection face, and the partial rectangular projection faces (e.g., four partial rectangular projection faces). The video encoder is arranged to encode the projection-based frame to generate a part of a bitstream.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
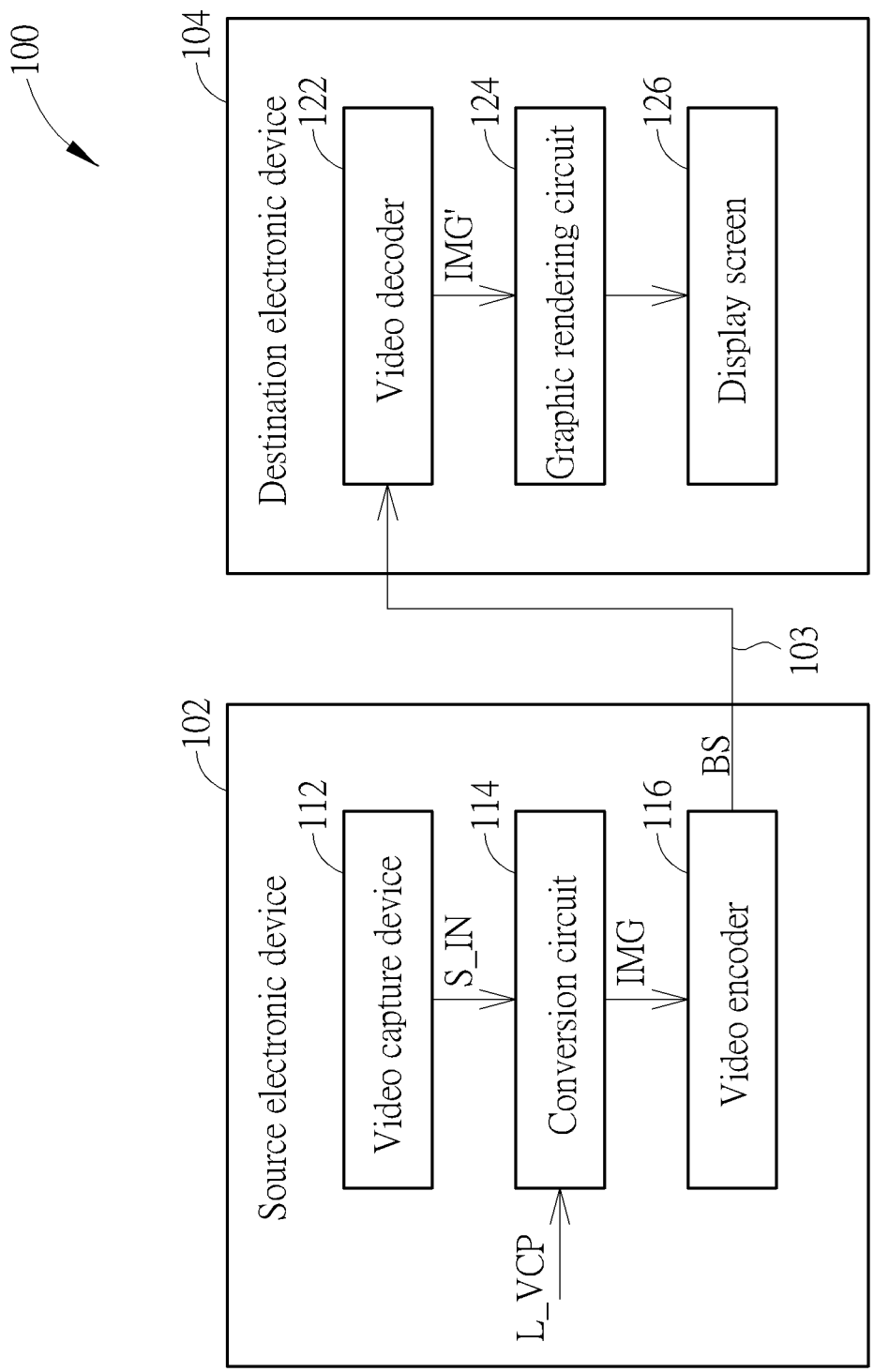
FIG. 1 is a diagram illustrating a 360-degree Virtual Reality (360 VR) system according to an embodiment of the present invention.

FIG. 1 is a diagram illustrating a 360-degree Virtual Reality (360 VR) system according to an embodiment of the present invention. The 360 VR system 100 includes two video processing apparatuses (e.g., a source electronic device 102 and a destination electronic device 104). The source electronic device 102 includes a video capture device 112, a conversion circuit 114, and a video encoder 116. For example, the video capture device 112 may be a set of cameras used to provide an omnidirectional image/video content (e.g., multiple images that cover the whole surroundings) S_IN corresponding to a viewing sphere. The conversion circuit 114 is coupled between the video capture device 112 and the video encoder 116. The conversion circuit 114 generates a projection-based frame IMG with a 360-degree Virtual Reality (360 VR) projection layout according to the omnidirectional image/video content S_IN. For example, the projection-based frame IMG may be one frame included in a sequence of projection-based frames generated from the conversion circuit 114. The video encoder 116 is an encoding circuit used to encode/compress the projection-based frame IMG to generate a part of a bitstream BS, and outputs the bitstream BS to the destination electronic device 104 via a transmission means 103. For example, the sequence of projection-based frames may be encoded into the bitstream BS, and the transmission means 103 may be a wired/wireless communication link or a storage medium.

The destination electronic device 104 may be a head-mounted display (HMD) device. As shown in FIG. 1, the destination electronic device 104 includes a video decoder 122, a graphic rendering circuit 124, and a display screen 126. The video decoder 122 is a decoding circuit used to receive the bitstream BS from the transmission means 103 (e.g., a wired/wireless communication link or a storage medium), and decode the received bitstream BS to generate a decoded frame IMG'. For example, the video decoder 122 generates a sequence of decoded frames by decoding the received bitstream BS, where the decoded frame IMG' is one frame included in the sequence of decoded frames. In this embodiment, the projection-based frame IMG to be encoded by the video encoder 116 has a 360 VR projection format with a projection layout. Hence, after the bitstream BS is decoded by the video decoder 122, the decoded frame IMG' has the same 360 VR projection format and the same projection layout. The graphic rendering circuit 124 is coupled between the video decoder 122 and the display screen 126. The graphic rendering circuit 124 renders and displays an output image data on the display screen 126 according to the decoded frame IMG'. For example, a viewport area associated with a portion of the 360-degree image/video content carried by the decoded frame IMG' may be displayed on the display screen 126 via the graphic rendering circuit 124.

The present invention proposes an innovative viewport-based cube projection layout design that has a compact form and/or can preserve the image/video content of the user's viewport in a main projection face (e.g., a central rectangular projection face). As mentioned above, the conversion circuit 114 generates the projection-based frame IMG according to the 360 VR projection layout and the omnidirectional image/video content S_IN. In this embodiment, the aforementioned 360 VR projection layout is a viewport-based cube projection layout L_VCP by packing six rectangular projection faces. Specifically, the projection-based frame IMG has a 360-degree image/video content represented by six rectangular projection faces packed in the proposed viewport-based cube projection layout L_VCP. Further details of the proposed viewport-based cube projection layout L_VCP are provided hereinafter.

It should be noted that, a rectangle is a quadrilateral with all four angles being right angles, and a square is a quadrilateral with all four angles being right angles and all four sides being the same length. Hence, a square is a special kind of rectangle. A shape of a rectangular projection face mentioned hereinafter may be a rectangle or a square, depending upon a location of the rectangular projection face in a proposed viewport-based cube projection layout.

Figure 2:
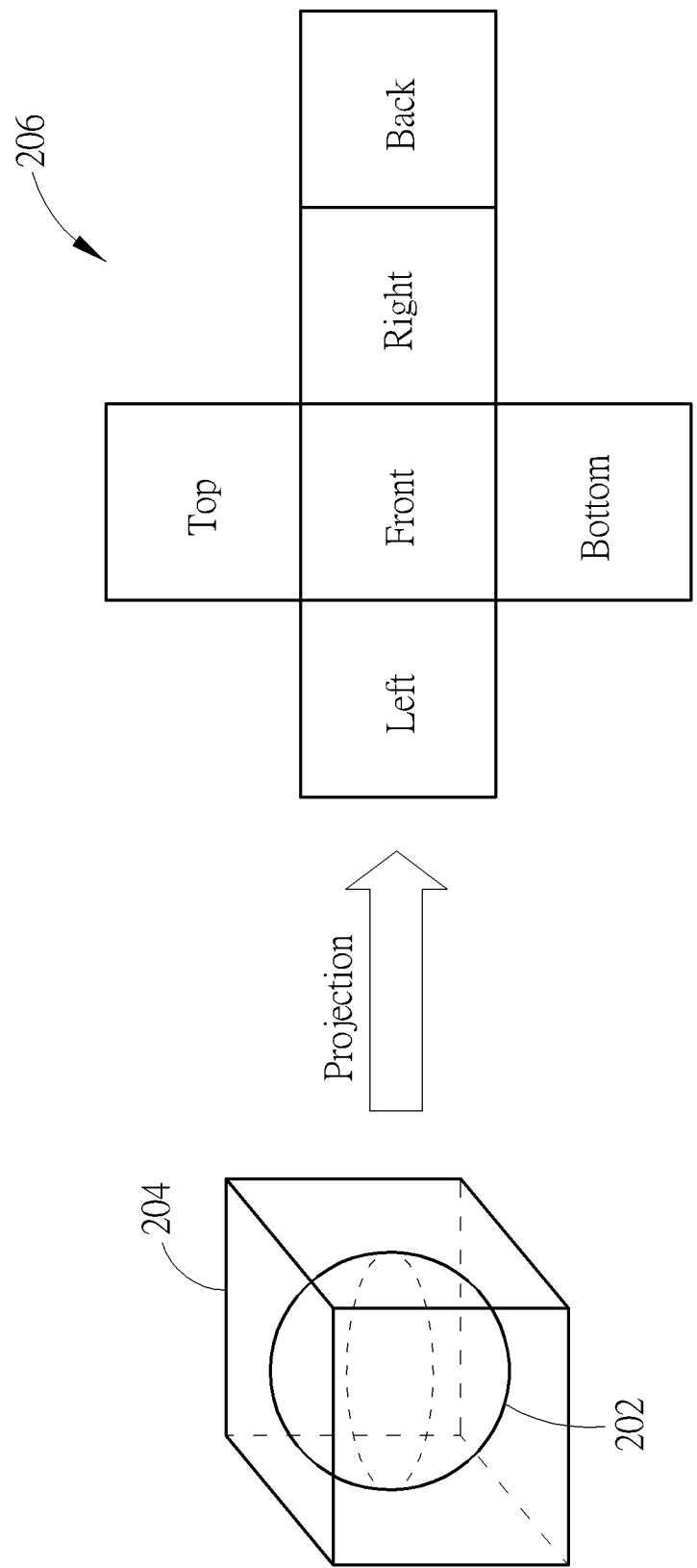
FIG. 2 is a diagram illustrating six square projection faces of a cubemap projection layout, obtained from a cube projection of a viewing sphere.

FIG. 2 is a diagram illustrating six square projection faces of a cubemap projection (CMP) layout, obtained from a cube projection of a viewing sphere. An omnidirectional image/video content of a viewing sphere 202 is mapped onto six square projection faces (labeled by "Left", "Front", "Right", "Back", "Top", and "Bottom") of a cube 204. As shown in FIG. 2, the square projection faces "Left", "Front", "Right", "Back", "Top", and "Bottom" are arranged in a CMP layout 206.

The projection-based frame IMG to be encoded is required to be rectangular. If the CMP layout 206 is directly used for creating the projection-based frame IMG, the projection-based frame IMG has to be filled with dummy areas (e.g., black areas or white areas) to form a rectangle frame for encoding. Thus, there is a need for a compact projection layout that can eliminate dummy areas (e.g., black areas or white areas) to improve the coding efficiency. The present invention therefore proposes a viewport-based cube projection layout design that has a compact form and can preserve the image/video content of the user's viewport (i.e., viewport area) in a main projection face (e.g., a central rectangular projection face).

Figure 3:
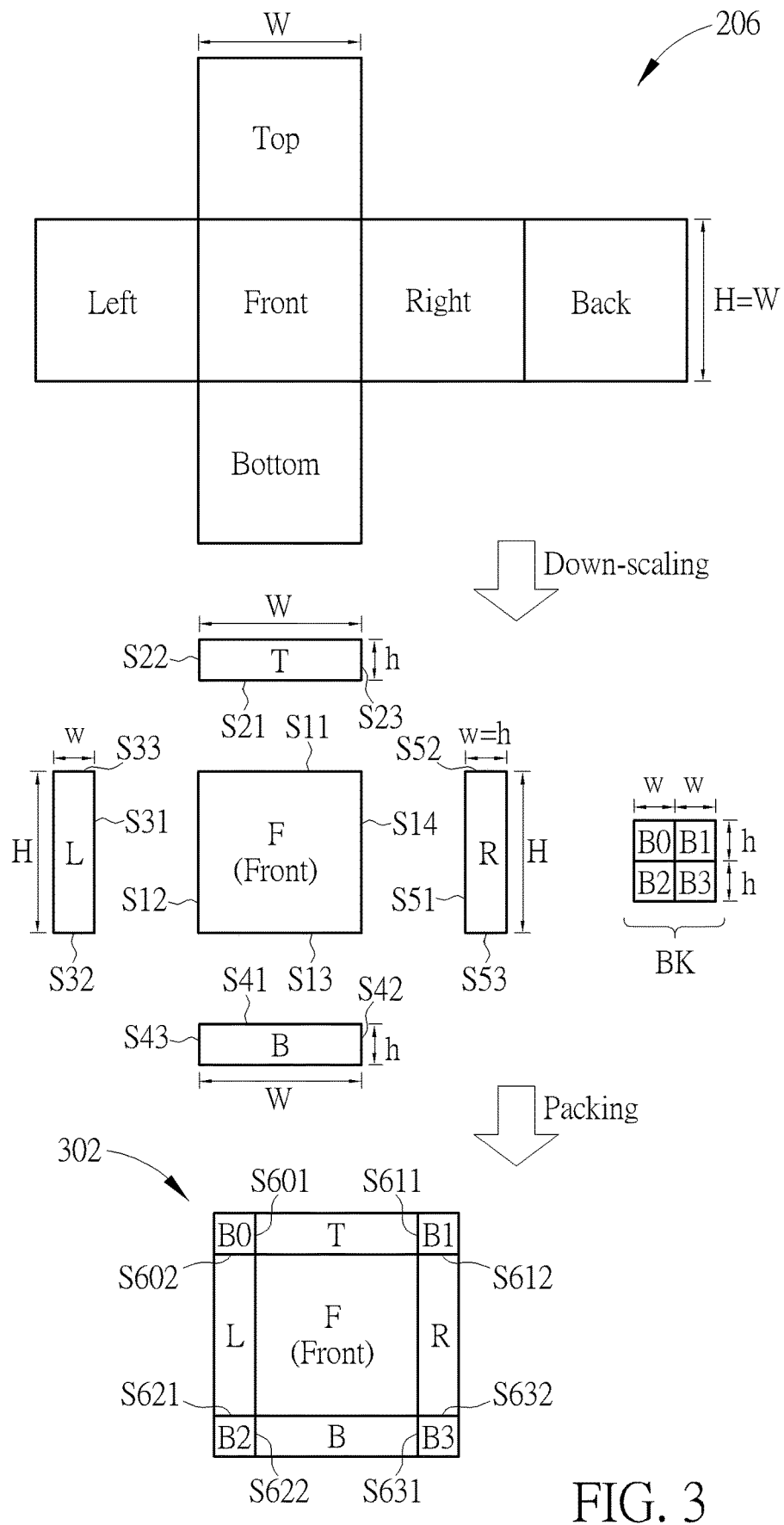
FIG. 3 is a diagram illustrating a first proposed viewport-based cube projection layout according to an embodiment of the present invention.

FIG. 3 is a diagram illustrating a first proposed viewport-based cube projection layout according to an embodiment of the present invention. The first proposed viewport-based cube projection layout 302 may be derived from the CMP layout 206 with projection face down-scaling. As shown in the top part of FIG. 3, the width of each square projection face is W, and the height of each square projection face is H (H=W). As shown in the middle part of FIG. 3, a rectangular projection face "T" is derived by down-scaling the square projection face "Top" in its height direction with a first pre-defined down-scaling factor s (s=H/h), a rectangular projection face "L" is derived by down-scaling the square projection face "Left" in its width direction with the first pre-defined down-scaling factor s (s=W/w), a rectangular projection face "B" is derived by down-scaling the square projection face "Bottom" in its height direction with the first pre-defined down-scaling factor s, and a rectangular projection face "R" is derived by down-scaling the square projection face "Right" in its width direction with the first pre-defined down-scaling factor s. In addition, a rectangular projection face "BK" is derived by down-scaling the square projection face "Back" in its width direction with a second pre-defined down-scaling factor t (t=0.5*s) and down-scaling the square projection face "Back" in its height direction with the second pre-defined down-scaling factor t. In this embodiment, the rectangular projection face "BK" is equally split into four partial rectangular projection faces "B0", B1", "B2", and "B3", each of which has width w and height h (h=w). It should be noted that the rectangular projection face "BK" is also a square projection face, such that a shape of each of the partial rectangular projection faces "B0", B1", "B2", and B3" is also a square. Moreover, the square projection face "Front" in the CMP layout 206 corresponds to a user's viewport, and is directly used as a rectangular projection face "F" needed by the first proposed viewport-based cube projection layout 302. Hence, a shape of the rectangular projection face "F" is a square with width W and height H (H=W).

The rectangular projection faces "F", "T", "L", "B", and "R" and the four partial rectangular projection faces "B0", "B1", "B2", and "B3" are packed in the first proposed viewport-based cube projection layout 302. As shown in the bottom part of FIG. 3, the rectangular projection face "F" corresponds to the user's viewport, and is enclosed by a surrounding area composed of the rectangular projection faces "T", "L", "B", and "R" and the four partial rectangular projection faces "B0", "B1", "B2", and "B3". More specifically, side S21 of the rectangular projection face "T" connects with side S11 of the rectangular projection face "F", side S22 of the rectangular projection face "T" connects with side S601 of the partial rectangular projection face "B0", side S23 of the rectangular projection face "T" connects with side S611 of the partial rectangular projection face "B1", side S31 of the rectangular projection face "L" connects with side S12 of the rectangular projection face "F", side S32 of the rectangular projection face "L" connects with side S621 of the partial rectangular projection face "B2", side S33 of the rectangular projection face "L" connects with side S602 of the partial rectangular projection face "B0", side S41 of the rectangular projection face "B" connects with side S13 of the rectangular projection face "F", side S42 of the rectangular projection face "B" connects with side S631 of the partial rectangular projection face "B3", side S43 of the rectangular projection face "B" connects with side S622 of the partial rectangular projection face "B2", side S51 of the rectangular projection face "R" connects with side S14 of the rectangular projection face "F", side S52 of the rectangular projection face "R" connects with side S612 of the partial rectangular projection face "B1", and side S53 of the rectangular projection face "R" connects with side S632 of the partial rectangular projection face "B3".

Since the rectangular projection face "T" is a down-scaled version of the square projection face "Top" that is adjacent to the square projection face "Front", there is an image continuity boundary between the side S21 of the rectangular projection face "T" and the side S11 of the rectangular projection face "F". Since the rectangular projection face "L" is a down-scaled version of the square projection face "Left" that is adjacent to the square projection face "Front", there is an image continuity boundary between the side S31 of the rectangular projection face "L" and the side S12 of the rectangular projection face "F". Since the rectangular projection face "B" is a down-scaled version of the square projection face "Bottom" that is adjacent to the square projection face "Front", there is an image continuity boundary between the side S41 of the rectangular projection face "B" and the side S13 of the rectangular projection face "B". Since the rectangular projection face "R" is a down-scaled version of the square projection face "Right" that is adjacent to the square projection face "Front", there is an image continuity boundary between the side S51 of the rectangular projection face "R" and the side S14 of the rectangular projection face "F".

The rectangular projection face "B" is a down-scaled version of the square projection face "Back" of the cube 204 that is opposite to the square projection face "Front" of the cube 204. To make a shape of the first proposed viewport-based cube projection layout 302 be a rectangle (particularly, a square), the rectangular projection face "B" is equally split into four partial rectangular projection faces "B0", "B1", "B2", and "B3", and the partial rectangular projection faces "B0", "B1", "B2", and "B3" are located at four corners of the first proposed viewport-based cube projection layout 302. Hence, an image content discontinuity boundary exists between the side S601 of the partial rectangular projection face "B0" and the side S22 of the rectangular projection face "T", an image content discontinuity boundary exists between the side S602 of the partial rectangular projection face "B0" and the side S33 of the rectangular projection face "L", an image content discontinuity boundary exists between the side S621 of the partial rectangular projection face "B2" and the side S32 of the rectangular projection face "L", an image content discontinuity boundary exists between the side S622 of the partial rectangular projection face "B2" and the side S43 of the rectangular projection face "B", an image content discontinuity boundary exists between the side S631 of the partial rectangular projection face "B3" and the side S42 of the rectangular projection face "B", an image content discontinuity boundary exists between the side S632 of the partial rectangular projection face "B3" and the side S53 of the rectangular projection face "R", an image content discontinuity boundary exists between the side S611 of the partial rectangular projection face "B1" and the side S23 of the rectangular projection face "T", and an image content discontinuity boundary exists between the side S612 of the partial rectangular projection face "B1" and the side S52 of the rectangular projection face "R".

It should be noted that the arrangement of the four partial rectangular projection faces "B0", "B1", "B2", and "B3" located at four corners of the first proposed viewport-based cube projection layout 302 is for illustrative purposes only, and is not meant to be a limitation of the present invention. In one alternative design, the located order of partial rectangular projection faces "B0", "B1", "B2", and "B3" may be changed, depending upon the actual design considerations. That is, the partial rectangular projection face "B0" is not necessarily located at the top-left corner of the first proposed viewport-based cube projection layout 302, the partial rectangular projection face "B1" is not necessarily located at the top-right corner of the first proposed viewport-based cube projection layout 302, the partial rectangular projection face "B2" is not necessarily located at the bottom-left corner of the first proposed viewport-based cube projection layout 302, and/or the partial rectangular projection face "B3" is not necessarily located at the bottom-right corner of the first proposed viewport-based cube projection layout 302.

In another alternative design, the orientation of one or more of the partial rectangular projection faces "B0", "B1", "B2", and "B3" may be adjusted, depending upon the actual design consideration. That is, the partial rectangular projection face "B0" may be rotated with 90°/180°/270° when packed in the first proposed viewport-based cube projection layout 302, the partial rectangular projection face "B1" may be rotated with 90°/180°/270° when packed in the first proposed viewport-based cube projection layout 302, the partial rectangular projection face "B2" may be rotated with 90°/180°/270° when packed in the first proposed viewport-based cube projection layout 302, and/or the partial rectangular projection face "B3" may be rotated with 90°/180°/270° when packed in the first proposed viewport-based cube projection layout 302.

Figure 4:
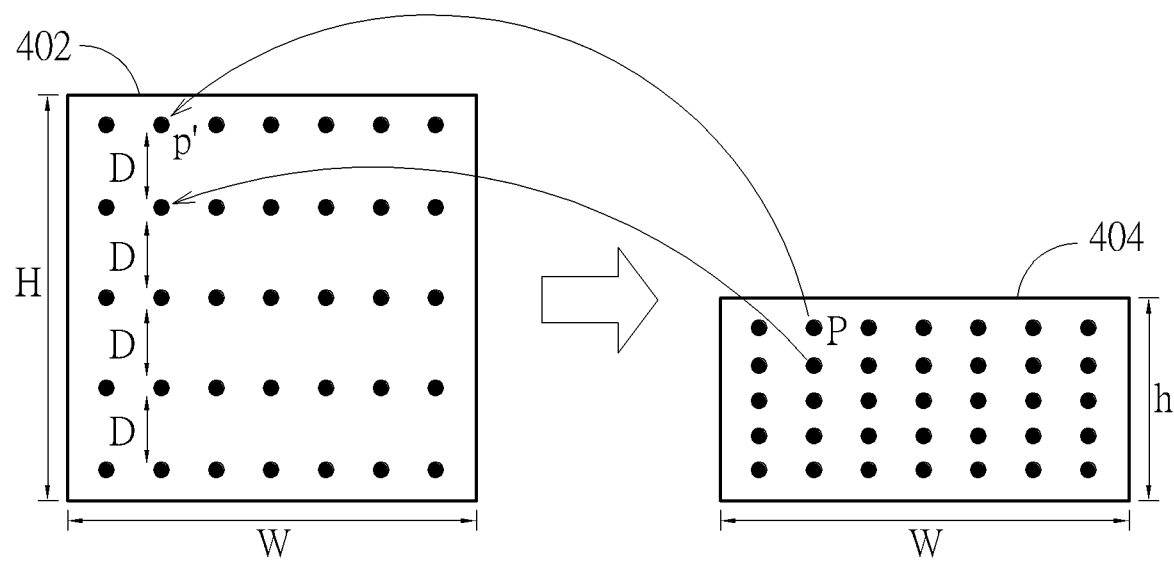
FIG. 4 is a diagram illustrating an example of downscaling a square projection face through uniform mapping.
Figure 5:
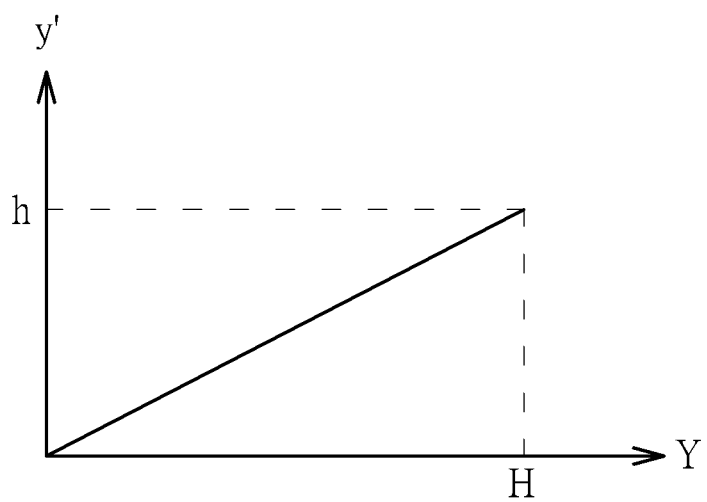
FIG. 5 is a diagram illustrating a curve of a uniform mapping function according to an embodiment of the present invention.

As mentioned above, each of the rectangular projection faces "T", "L", "B", "R" and "BK" is derived from down-scaling a corresponding square projection face "Top"/"Left"/"Bottom"/"Right"/"Back". In some embodiments of the present invention, down-scaling the corresponding square projection face "Top"/"Left"/"Bottom"/"Right"/"Back" may be achieved by re-sampling the corresponding square projection face "Top"/"Left"/"Bottom"/"Right"/"Back" through uniform mapping. Please refer to FIG. 4 in conjunction with FIG. 5. FIG. 4 is a diagram illustrating an example of down-scaling a square projection face through uniform mapping. FIG. 5 is a diagram illustrating a curve of a uniform mapping function according to an embodiment of the present invention. In this example, a rectangular projection face 404 is derived by down-scaling a square projection face 402 in its height direction, where the square projection face 402 has width W and height H (H=W), and the rectangular projection face 404 has width W and height h (h<H). By way of example, but not limitation, the uniform mapping function may be expressed by using the following formula.

$$y' = \frac{h}{H} * Y \quad (1)$$

Hence, regarding a pixel position located at a coordinate y' of y-axis in the rectangular projection face 404, a corresponding sampling point located at a coordinate Y of y-axis in the square projection face 402 can be determined from the uniform mapping function expressed in formula (1). The pixel value of a position P in the rectangular projection face 404 is derived by using the pixel value of the corresponding sampling position p' in the square projection face 402. Due to the uniform mapping in the height direction, two vertically adjacent sampling points in the rectangular projection face 402 are uniformly distributed with a constant distance D.

A sampling point (i.e., the obtained pixel position p') in the square projection face 402 may not be an integer position. If a y-axis coordinate Y of a sampling point in the square projection face 402 is a non-integer position, an interpolation filter (not shown) in the conversion circuit 114 may be applied to integer pixels around the sampling point in the square projection face 402 to derive the pixel value of the sampling point. For example, the interpolation filter may be a bilinear filter, a bicubic filter, or a Lanczos filter.

In another case where the rectangular projection face 404 is derived from down-scaling the square projection face 402 in its width direction. The uniform mapping function may be expressed by using the following formula.

$$x' = \frac{h}{H} * X \quad (2)$$

Hence, regarding a pixel position located at a coordinate x' of x-axis in the rectangular projection face 404, a corresponding sampling point located at a coordinate X of x-axis in the square projection face 402 can be determined from the uniform mapping function expressed in formula (2). The pixel value of a position P in the rectangular projection face 404 is derived by using the pixel value of the corresponding sampling position p' in the square projection face 402. Due to the uniform mapping in the width direction, two horizontally adjacent sampling points in the rectangular projection face 402 are uniformly distributed with a constant distance.

A sampling point (i.e., the obtained pixel position p') in the square projection face 402 may not be an integer position. If an x-axis coordinate X of a sampling point in the square projection face 402 is a non-integer position, an interpolation filter (not shown) in the conversion circuit 114 may be applied to integer pixels around the sampling point in the square projection face 402 to derive the pixel value of the sampling point. For example, the interpolation filter may be a bilinear filter, a bicubic filter, or a Lanczos filter.

In yet another case where the rectangular projection face 404 is derived from down-scaling the square projection face 402 in its height direction and width direction. Hence, regarding a pixel position located at a coordinate y' of y-axis in the rectangular projection face 404, a corresponding sampling point located at a coordinate Y of y-axis in the square projection face 402 can be determined from the uniform mapping function expressed in formula (1). In addition, regarding a pixel position located at a coordinate x' of x-axis in the rectangular projection face 404, a corresponding sampling point located at a coordinate X of x-axis in the square projection face 402 can be determined from the uniform mapping function expressed in formula (2). The pixel value of a position P in the rectangular projection face 404 is derived by using the pixel value of the corresponding sampling position p' in the square projection face 402. Due to the uniform mapping in both of the height direction and the width direction, the sampling points in the rectangular projection face 402 are uniformly distributed.

A sampling point (i.e., the obtained pixel position p') in the square projection face 402 may not be an integer position. If at least one of an x-axis coordinate X and a y-axis coordinate Y of a sampling point in the square projection face 402 is a non-integer position, an interpolation filter (not shown) in the conversion circuit 114 may be applied to integer pixels around the sampling point in the square projection face 402 to derive the pixel value of the sampling point. For example, the interpolation filter may be a bilinear filter, a bicubic filter, or a Lanczos filter.

Figure 6:
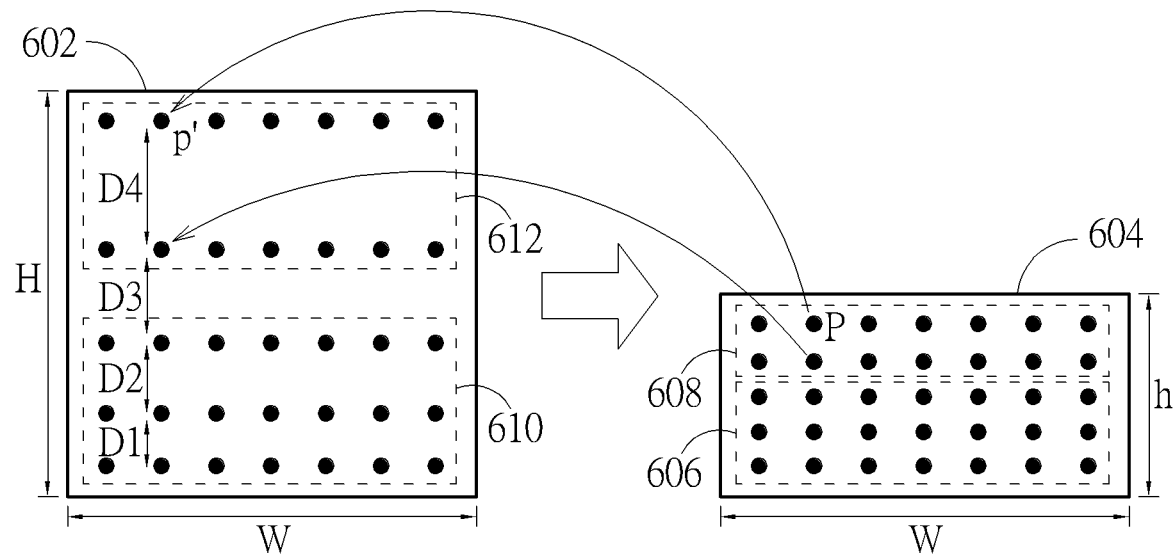
FIG. 6 is a diagram illustrating an example of downscaling a square projection face through non-uniform mapping.
Figure 7:
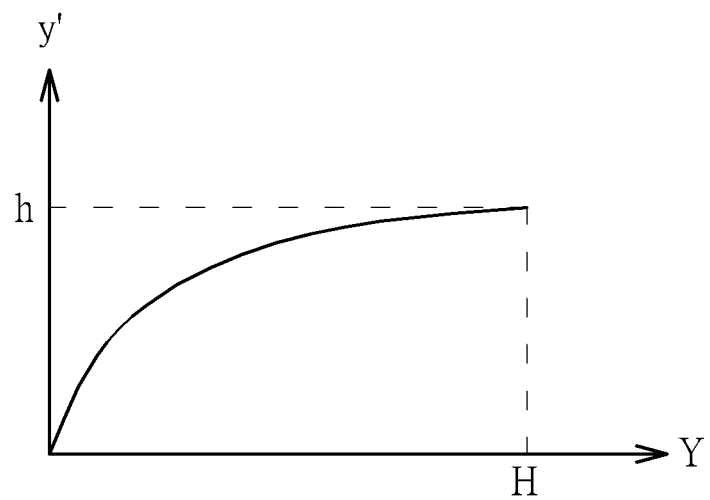
FIG. 7 is a diagram illustrating a curve of a non-uniform mapping function according to an embodiment of the present invention.

To preserve more details near the main projection face (e.g., the central rectangular projection face "F" that corresponds to the user's viewport), the present invention further proposes re-sampling the corresponding square projection face "Top"/"Left"/"Bottom"/"Right"/"Back" through non-uniform mapping. Please refer to FIG. 6 in conjunction with FIG. 7. FIG. 6 is a diagram illustrating an example of down-scaling a square projection face through non-uniform mapping. FIG. 7 is a diagram illustrating a curve of a non-uniform mapping function according to an embodiment of the present invention. In this example, a rectangular projection face 604 is derived from down-scaling a square projection face 602 in its height direction, where the square projection face 602 has width W and height H (H=W), and the rectangular projection face 604 has width W and height h (h<H). By way of example, but not limitation, the non-uniform mapping function may be expressed by using the following formula.

$$\frac{y'}{h} = 1 - \left(1 - \frac{Y}{H}\right)^n \quad (3)$$

Hence, regarding a pixel position located at a coordinate y' of y-axis in the rectangular projection face 604, a corresponding sampling point located at a coordinate Y of y-axis in the square projection face 602 can be determined from the non-uniform mapping function expressed in formula (3). As shown in FIG. 6, the interval between two vertically adjacent sampling points is not a constant. For example, the interval between two vertically adjacent sampling points may be one of D1, D2, D3 and D4, where D4>D3>D2>D1. Specifically, the sampling points are non-uniformly distributed in the height direction of the square projection face 602. The pixel value of a position P in the rectangular projection face 604 is derived by using the pixel value of the corresponding sampling position p' in the square projection face 602. For example, pixels in a first down-scaled region 606 in the rectangular projection face 604 are obtained by re-sampling a first source region 610 of the square projection face 602, and pixels in a second down-scaled region 608 in the rectangular projection face 604 are obtained by re-sampling the second source region 612 of the square projection face 602. Due to the non-uniform mapping in the height direction, the density of sampling points obtained from the first source region 610 is different from the density of sampling points obtained from the second source region 612. In other words, the first down-scaled region 610 is derived by re-sampling the first source region 610 with a first sampling density, and the second down-scaled region 612 is derived by re-sampling the second source region 612 with a second sampling density, wherein the second sampling density is different from the first sampling density.

To preserve more details near the main projection face (e.g., the central rectangular projection face "F" that corresponds to the user's viewport), the first sampling density and the second sampling density are properly controlled by the non-uniform mapping. Assuming that the first source region 610 is closer to a center of the user's viewport (e.g., a center of the rectangular projection face "Front") than the second region 612, the first sampling density is particularly set to be higher than the second sampling density. In this way, most of the pixels in the rectangular projection face 604 are derived by re-sampling the first source region 610 in the square projection face 602.

A sampling point (i.e., the obtained pixel position p') in the square projection face 602 may not be an integer position. If a y-axis coordinate Y of a sampling point in the square projection face 602 is a non-integer position, an interpolation filter (not shown) in the conversion circuit 114 may be applied to integer pixels around the sampling point in the square projection face 602 to derive the pixel value of the sampling point. For example, the interpolation filter may be a bilinear filter, a bicubic filter, or a Lanczos filter.

In another case where the rectangular projection face 604 is derived from down-scaling the square projection face 602 in its width direction. The non-uniform mapping function may be expressed by using the following formula.

$$\frac{x'}{h} = 1 - \left(1 - \frac{X}{H}\right)^n \quad (4)$$

Hence, regarding a pixel position located at a coordinate x' of x-axis in the rectangular projection face 604, a corresponding sampling point located at a coordinate X of x-axis in the square projection face 602 can be determined from the non-uniform mapping function expressed in formula (4). Specifically, the sampling points are non-uniformly distributed in the width direction of the square projection face 602. The pixel value of a position P in the rectangular projection face 604 is derived by using the pixel value of the corresponding sampling position p' in the square projection face 602. Due to the non-uniform mapping in the width direction, a first down-scaled region in the rectangular projection face 604 is derived by re-sampling a first source region of the square projection face 602 with a first sampling density, and a second down-scaled region in the rectangular projection face 604 is derived by re-sampling a second source region of the square projection face 602 with a second sampling density, wherein the second sampling density is different from the first sampling density. For example, when the first source region of the square projection face 602 is closer to a center of the user's viewport than the second source region of the square projection face 602, the first sampling density is particularly set to be higher than the second sampling density.

A sampling point (i.e., the obtained pixel position p') in the square projection face 602 may not be an integer position. If an x-axis coordinate X of a sampling point in the square projection face 602 is a non-integer position, an interpolation filter (not shown) in the conversion circuit 114 may be applied to integer pixels around the sampling point in the square projection face 602 to derive the pixel value of the sampling point. For example, the interpolation filter may be a bilinear filter, a bicubic filter, or a Lanczos filter.

In yet another case where the rectangular projection face 604 is derived from down-scaling the square projection face 602 in its height direction and width direction. Hence, regarding a pixel position located at a coordinate y' of y-axis in the rectangular projection face 604, a corresponding sampling point located at a coordinate Y of y-axis in the square projection face 602 can be determined from the non-uniform mapping function expressed in formula (3). In addition, regarding a pixel position located at a coordinate x' of x-axis in the rectangular projection face 604, a corresponding sampling point located at a coordinate X of x-axis in the square projection face 602 can be determined from the non-uniform mapping function expressed in formula (4). Specifically, the sampling points are non-uniformly distributed in the height direction of the square projection face 602, and are also non-uniformly distributed in the width direction of the square projection face 602. The pixel value of a position P in the rectangular projection face 604 is derived by using the pixel value of the corresponding sampling position p' in the square projection face 602. Due to the non-uniform mapping in the height direction and the width direction, a first down-scaled region in the rectangular projection face 604 is derived by re-sampling a first source region of the square projection face 602 with a first sampling density, and a second down-scaled region in the rectangular projection face 604 is derived by re-sampling a second source region of the square projection face 602 with a second sampling density, where the second sampling density is different from the first sampling density. For example, when the first source region of the square projection face 602 is closer to a center of the user's viewport than the second source region of the square projection face 602, the first sampling density is particularly set to be higher than the second sampling density.

A sampling point (i.e., the obtained pixel position p') in the square projection face 602 may not be an integer position. If at least one of an x-axis coordinate X and a y-axis coordinate Y of a corresponding sampling point in the square projection face 602 is a non-integer position, an interpolation filter (not shown) in the conversion circuit 114 may be applied to integer pixels around the sampling point in the square projection face 602 to derive the pixel value of the sampling point. For example, the interpolation filter may be a bilinear filter, a bicubic filter, or a Lanczos filter.

It should be noted that the aforementioned non-uniform mapping functions are for illustrative purposes, and are not meant to be limitations of the present invention. In some embodiments of the present invention, a different non-uniform mapping function may be employed by the conversion circuit 114 for projection face down-scaling.

The non-uniform mapping can be employed to preserve more details near the main projection face (e.g., the rectangular projection face "F") in the first proposed viewport-based cube projection layout 302. For example, most of the pixels of the rectangular projection face "T" are derived by re-sampling a bottom part of the square projection face "Top", most of the pixels of the rectangular projection face "L" are derived by re-sampling a right part of the square projection face "Left", most of the pixels of the rectangular projection face "B" are derived by re-sampling a top part of the square projection face "Bottom", and most of the pixels of the rectangular projection face "R" are derived by re-sampling a left part of the square projection face "Right". As mentioned above, an image content continuity boundary exists between the rectangular projection faces "F" and "T", an image content continuity boundary exists between the rectangular projection faces "F" and "L", an image content continuity boundary exists between the rectangular projection faces "F" and "B", and an image content continuity boundary exists between the rectangular projection faces "F" and "L". Since more details near the main projection face (e.g., the rectangular projection face "F") can be preserved in the auxiliary projection faces "T", "L", "B", and "R" by the non-uniform mapping, the coding efficiency of the projection-based image IMG can be further improved. For example, compared to the coding efficiency of the projection-based image IMG having rectangular projection faces "T", "L", "B", and "R" generated by down-scaling with uniform mapping, the coding efficiency of the projection-based image IMG having rectangular projection faces "T", "L", "B", and "R" generated by down-scaling with non-uniform mapping is better.

It should be noted that the non-uniform mapping may also be used for generating the rectangular projection face "BK" that is equally split into partial rectangular projection faces "B0", "B1", "B2", and "B3". For example, most of the pixels of the rectangular projection face "BK" are derived from re-sampling a central part of the square projection face "Back" due to the fact that the central part of the square projection face "Back" is closer to the center of the user's viewport than a surrounding part of the square projection face "Back".

Regarding the first proposed viewport-based cube projection layout 302 shown in FIG. 3, the rectangular projection face "F" is the same as the square projection face "Front" in the CMP layout 206. In other words, the viewport area in the square projection face "Front" is fully preserved by the rectangular projection face "F". However, this is for illustrative purposes only, and is not meant to be a limitation of the present invention. Alternatively, the rectangular projection face "F" may be a down-scaled version of the square projection face "Front" in the CMP layout 206.

Figure 8:
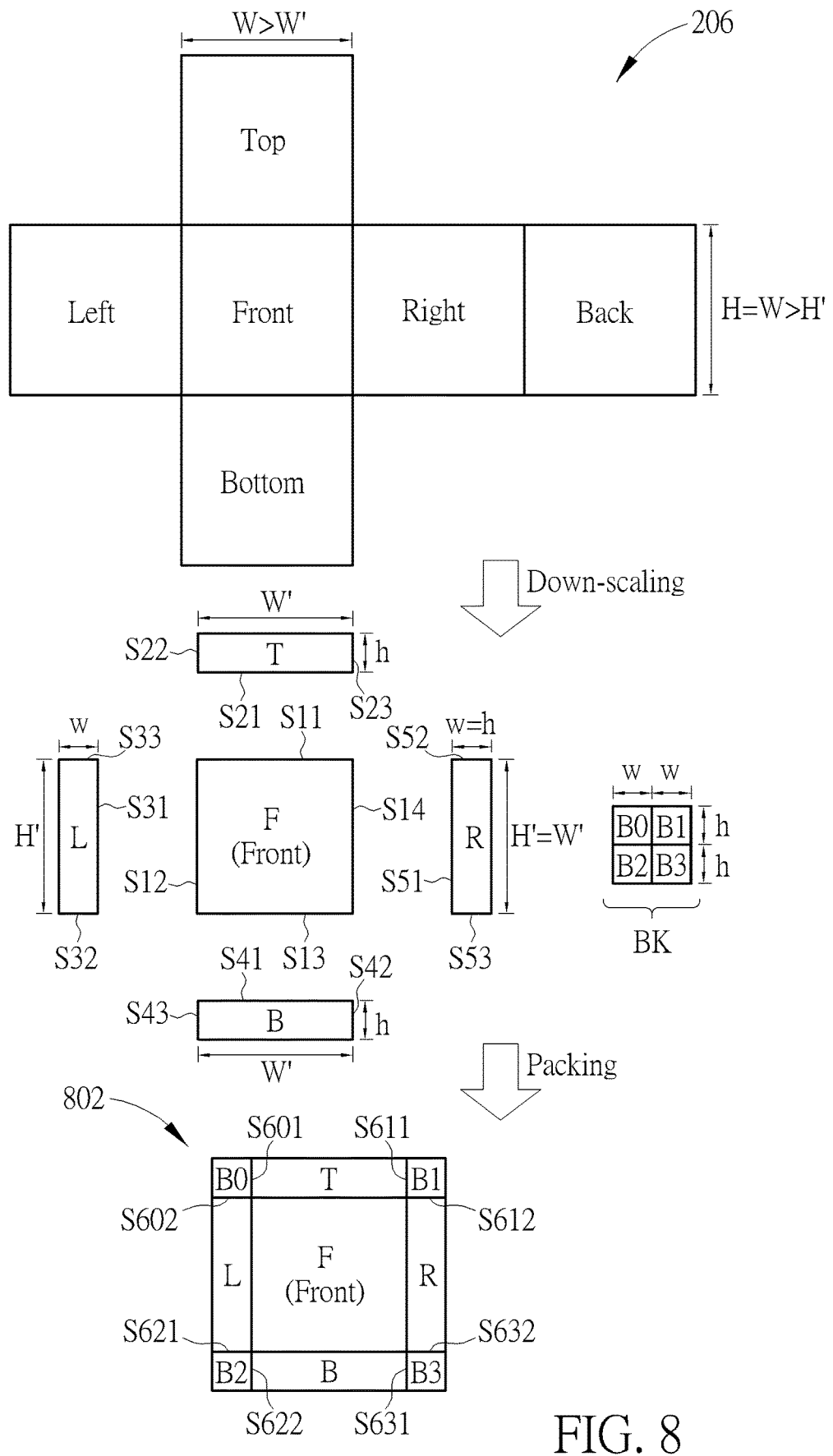
FIG. 8 is a diagram illustrating a second proposed viewport-based cube projection layout according to an embodiment of the present invention.

FIG. 8 is a diagram illustrating a second proposed viewport-based cube projection layout according to an embodiment of the present invention. The second proposed viewport-based cube projection layout 802 may be derived from the CMP layout 206 with projection face down-scaling. As shown in the top part of FIG. 8, the width of each square projection face is W, and the height of each square projection face is H (H=W). As shown in the middle part of FIG. 8, a rectangular projection face "F" is derived by down-scaling the square projection face "Front" in its height direction with a first pre-defined down-scaling factor u (u=H/H') and down-scaling the square projection face "Front" in its width direction with the first pre-defined down-scaling factor u (u=W/W', where W'=H'), a rectangular projection face "T" is derived by down-scaling the square projection face "Top" in its height direction with a second pre-defined down-scaling factors (s=H/h) and down-scaling the square projection face "Top" in its width direction with the first pre-defined down-scaling factor u, a rectangular projection face "L" is derived by down-scaling the square projection face "Left" in its width direction with the second pre-defined down-scaling factor s (s=W/w, where w=h) and down-scaling the square projection face "Left" in its height direction with the first pre-defined down-scaling factor u, a rectangular projection face "B" is derived by down-scaling the square projection face "Bottom" in its height direction with the second pre-defined down-scaling factor s and down-scaling the square projection face "Bottom" in its width direction with the first pre-defined down-scaling factor u, and a rectangular projection face "R" is derived by down-scaling the square projection face "Right" in its width direction with the second pre-defined down-scaling factor s and down-scaling the square projection face "Right" in its height direction with the first pre-defined down-scaling factor u. In addition, a rectangular projection face "BK" is derived by down-scaling the square projection face "Back" in its width direction with a third pre-defined down-scaling factor t (t=0.5*s) and down-scaling the square projection face "Back" in its height direction with the third pre-defined down-scaling factor t. In this embodiment, the rectangular projection face "BK" is equally split into partial rectangular projection faces "B0", "B1", "B2", and "B3", each of which has width w and height h (w=h). It should be noted that the rectangular projection face "BK" is also a square projection face, such that a shape of each of the partial rectangular projection faces "B0", "B1", "B2", and "B3" is also a square. Moreover, a shape of the rectangular projection face "F" is a square.

In one exemplary down-scaling design, the rectangular projection face "T"/"L"/"B"/"R"/"BK" is derived from re-sampling a corresponding square projection face "Top"/"Left"/"Bottom"/"Right"/"Back" through uniform mapping. In another exemplary down-scaling design, the rectangular projection face "T"/"L"/"B"/"R"/"BK" is derived from re-sampling a corresponding square projection face "Top"/"Left"/"Bottom"/"Right"/"Back" through non-uniform mapping. Since a person skilled in the art can readily know details of down-scaling with uniform mapping and down-scaling with non-uniform mapping after reading above paragraphs, further description is omitted here for brevity.

The rectangular projection faces "F", "T", "L", "B", and "R" and the partial rectangular projection faces "B0", "B1", "B2", and "B3" are packed in the second proposed viewport-based cube projection layout 802. As shown in the bottom part of FIG. 8, the rectangular projection face "F" corresponds to the user's viewport, and is enclosed by a surrounding area composed of the rectangular projection faces "T", "L", "B", and "R" and the partial rectangular projection faces "B0", "B1", "B2", and "B3". More specifically, side S21 of the rectangular projection face "T" connects with side S11 of the rectangular projection face "F", side S22 of the rectangular projection face "T" connects with side S601 of the partial rectangular projection face "B0", side S23 of the rectangular projection face "T" connects with side S611 of the partial rectangular projection face "B1", side S31 of the rectangular projection face "L" connects with side S12 of the rectangular projection face "F", side S32 of the rectangular projection face "L" connects with side S621 of the partial rectangular projection face "B2", side S33 of the rectangular projection face "L" connects with side S602 of the partial rectangular projection face "B0", side S41 of the rectangular projection face "B" connects with side S13 of the rectangular projection face "F", side S42 of the rectangular projection face "B" connects with side S631 of the partial rectangular projection face "B3", side S43 of the rectangular projection face "B" connects with side S622 of the partial rectangular projection face "B2", side S51 of the rectangular projection face "R" connects with side S14 of the rectangular projection face "F", side S52 of the rectangular projection face "R" connects with side S612 of the partial rectangular projection face "B1", and side S53 of the rectangular projection face "R" connects with side S632 of the partial rectangular projection face "B3".

Since a person skilled in the art can readily understand details of the second proposed viewport-based cube projection layout 802 after reading above paragraphs directed to the first proposed viewport-based cube projection layout 302, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing method comprising:
   receiving an omnidirectional image/video content corresponding to a viewing sphere;
   generating a projection-based frame according to the omnidirectional image/video content and a viewport-based cube projection layout, wherein the projection-based frame has a 360-degree image/video content represented by rectangular projection faces packed in the viewport-based cube projection layout, the rectangular projection faces comprise a first rectangular projection face, a second rectangular projection face, a third rectangular projection face, a fourth rectangular projection face, a fifth rectangular projection face and a sixth rectangular projection face that is split into partial rectangular projection faces, a shape of the projection-based frame having the rectangular projection faces packed therein is a rectangle, and within the projection-based frame that has the rectangular projection faces packed therein, the first rectangular projection face corresponds to a user's viewport and is enclosed by a surrounding area composed of the second rectangular projection face, the third rectangular projection face, the fourth rectangular projection face, the fifth rectangular projection face, and the partial rectangular projection faces that are located at four corners of the projection-based frame respectively; and
   encoding, by a video encoder, the projection-based frame to generate a part of a bitstream.

2. The video processing method of claim 1, wherein a first side of the first rectangular projection face connects with a first side of the second rectangular projection face; a second side of the first rectangular projection face connects with a first side of the third rectangular projection face; a third side of the first rectangular projection face connects with a first side of the fourth rectangular projection face; a fourth side of the first rectangular projection face connects with a first side of the fifth rectangular projection face; the partial rectangular projection faces comprise a first partial rectangular projection face, a second partial rectangular projection face, a third partial rectangular projection face, and a fourth partial rectangular projection face; the first partial rectangular projection face has a first side and a second side connecting with a second side of the second rectangular projection face and a second side of the third rectangular projection face, respectively; the third partial rectangular projection face has a first side and a second side connecting with a third side of the third rectangular projection face and a second side of the fourth rectangular projection face, respectively; the fourth partial rectangular projection face has a first side and a second side connecting with a third side of the fourth rectangular projection face and a second side of the fifth rectangular projection face, respectively; and the second partial rectangular projection face has a first side and a second side connecting with a third side of the second rectangular projection face and a third side of the fifth rectangular projection face, respectively.

3. The video processing method of claim 2, wherein there is an image continuity boundary between the first side of the first rectangular projection face and the first side of the second rectangular projection face, there is an image continuity boundary between the second side of the first rectangular projection face and the first side of the third rectangular projection face, there is an image continuity boundary between the third side of the first rectangular projection face and the first side of the fourth rectangular projection face, and there is an image continuity boundary between the fourth side of the first rectangular projection face and the first side of the fifth rectangular projection face.

4. The video processing method of claim 2, wherein there is an image discontinuity boundary between the first side of the first partial rectangular projection face and the second side of the second rectangular projection face, there is an image discontinuity boundary between the second side of the first partial rectangular projection face and the second side of the third rectangular projection face, there is an image discontinuity boundary between the first side of the third partial rectangular projection face and the third side of the third rectangular projection face, there is an image discontinuity boundary between the second side of the third partial rectangular projection face and the second side of the fourth rectangular projection face, there is an image discontinuity boundary between the first side of the fourth partial rectangular projection face and the third side of the fourth rectangular projection face, there is an image discontinuity boundary between the second side of the fourth partial rectangular projection face and the second side of the fifth rectangular projection face, there is an image discontinuity boundary between the first side of the second partial rectangular projection face and the third side of the second rectangular projection face, and there is an image discontinuity boundary between the second side of the second partial rectangular projection face and the third side of the fifth rectangular projection face.

5. The video processing method of claim 1, wherein generating the projection-based frame according to the omnidirectional image/video content and the viewport-based cube projection layout comprises:
   mapping the omnidirectional image/video content of the viewing sphere onto square projection faces via a cubemap projection of the viewing sphere; and deriving the first rectangular projection face, the second rectangular projection face, the third rectangular projection face, the fourth rectangular projection face, the fifth rectangular projection face, and the sixth rectangular projection face from the square projection faces, respectively, wherein each of the second rectangular projection face, the third rectangular projection face, the fourth rectangular projection face, the fifth rectangular projection face, and the sixth rectangular projection face is derived by down-scaling a corresponding square projection face.

6. The video processing method of claim 5, wherein deriving the first rectangular projection face, the second rectangular projection face, the third rectangular projection face, the fourth rectangular projection face, the fifth rectangular projection face, and the sixth rectangular projection face from the square projection faces, respectively, comprises:
directly using a first square projection face as the first rectangular projection face;
deriving the second rectangular projection face by down-scaling a second square projection face in its height direction with a first down-scaling factor;
deriving the third rectangular projection face by down-scaling a third square projection face in its width direction with the first down-scaling factor;
deriving the fourth rectangular projection face by down-scaling a fourth square projection face in its height direction with the first down-scaling factor;
deriving the fifth rectangular projection face by down-scaling a fifth square projection face in its width direction with the first down-scaling factor; and
deriving the sixth rectangular projection face by down-scaling a sixth square projection face in its height direction with a second down-scaling factor and down-scaling the sixth square projection face in its width direction with the second down-scaling factor, wherein the first down-scaling factor is two times as large as the second down-scaling factor.

7. The video processing method of claim 5, wherein deriving the first rectangular projection face, the second rectangular projection face, the third rectangular projection face, the fourth rectangular projection face, the fifth rectangular projection face, and the sixth rectangular projection face from the square projection faces, respectively, comprises:
deriving the first rectangular projection face by down-scaling a first square projection face in its height direction with a first down-scaling factor and down-scaling the first square projection face in its width direction with the first down-scaling factor;
deriving the second rectangular projection face by down-scaling a second square projection face in its height direction with a second down-scaling factor and down-scaling the second square projection face in its width direction with the first down-scaling factor;
deriving the third rectangular projection face by down-scaling a third square projection face in its height direction with the first down-scaling factor and down-scaling the third square projection face in its width direction with the second down-scaling factor;
deriving the fourth rectangular projection face by down-scaling a fourth square projection face in its height direction with the second down-scaling factor and down-scaling the fourth square projection face in its width direction with the first down-scaling factor;
deriving the fifth rectangular projection face by down-scaling a fifth square projection face in its height direction with the first down-scaling factor and down-scaling the fifth square projection face in its width direction with the second down-scaling factor; and
deriving the sixth rectangular projection face by down-scaling a sixth square projection face in its height direction with a third down-scaling factor and down-scaling the sixth square projection face in its width direction with the third down-scaling factor, wherein the second down-scaling factor is two times as large as the third down-scaling factor.

8. The video processing method of claim 5, wherein a shape of the viewport-based cube projection layout is a square; a shape of the first rectangular projection face is a square; a shape of each of the second rectangular projection face, the third rectangular projection face, the fourth rectangular projection face, and the fifth rectangular projection face is not a square; and a shape of each of the partial rectangular projection faces is a square.

9. The video processing method of claim 5, wherein down-scaling the corresponding square projection face comprises:
re-sampling the corresponding square projection face through non-uniform mapping, wherein the corresponding square projection face has a first source region and a second source region, said each of the second rectangular projection face, the third rectangular projection face, the fourth rectangular projection face, the fifth rectangular projection face, and the sixth rectangular projection face has a first down-scaled region and a second down-scaled region, the first down-scaled region is derived by re-sampling the first source region with a first sampling density, and the second down-scaled region is derived by re-sampling the second source region with a second sampling density that is different from the first sampling density.

10. The video processing method of claim 9, wherein the first source region is closer to a center of the user's viewport than the second source region, and the first sampling density is higher than the second sampling density.

11. A video processing apparatus comprising:
a conversion circuit, arranged to receive an omnidirectional image/video content corresponding to a viewing sphere, and generate a projection-based frame according to the omnidirectional image/video content and a viewport-based cube projection layout, wherein the projection-based frame has a 360-degree image/video content represented by rectangular projection faces packed in the viewport-based cube projection layout, the rectangular projection faces comprise a first rectangular projection face, a second rectangular projection face, a third rectangular projection face, a fourth rectangular projection face, a fifth rectangular projection face and a sixth rectangular projection face that is split into partial rectangular projection faces, a shape of the projection-based frame having the rectangular projection faces packed therein is a rectangle, and within the projection-based frame that has the rectangular projection faces packed therein, the first rectangular projection face corresponds to a user's viewport and is enclosed by a surrounding area composed of the second rectangular projection face, the third rectangular projection face, the fourth rectangular projection face, the fifth rectangular projection face, and the partial rectangular projection faces that are located at four corners of the projection-based frame respectively; and a video encoder, arranged to encode the projection-based frame to generate a part of a bitstream.

12. The video processing apparatus of claim 11, wherein a first side of the first rectangular projection face connects with a first side of the second rectangular projection face; a second side of the first rectangular projection face connects with a first side of the third rectangular projection face; a third side of the first rectangular projection face connects with a first side of the fourth rectangular projection face; a fourth side of the first rectangular projection face connects with a first side of the fifth rectangular projection face; the partial rectangular projection faces comprise a first partial rectangular projection face, a second partial rectangular projection face, a third partial rectangular projection face, and a fourth partial rectangular projection face; the first partial rectangular projection face has a first side and a second side connecting with a second side of the second rectangular projection face and a second side of the third rectangular projection face, respectively; the third partial rectangular projection face has a first side and a second side connecting with a third side of the third rectangular projection face and a second side of the fourth rectangular projection face, respectively; the fourth partial rectangular projection face has a first side and a second side connecting with a third side of the fourth rectangular projection face and a second side of the fifth rectangular projection face, respectively; and the second partial rectangular projection face has a first side and a second side connecting with a third side of the second rectangular projection face and a third side of the fifth rectangular projection face, respectively.

13. The video processing apparatus of claim 12, wherein there is an image continuity boundary between the first side of the first rectangular projection face and the first side of the second rectangular projection face, there is an image continuity boundary between the second side of the first rectangular projection face and the first side of the third rectangular projection face, there is an image continuity boundary between the third side of the first rectangular projection face and the first side of the fourth rectangular projection face, and there is an image continuity boundary between the fourth side of the first rectangular projection face and the first side of the fifth rectangular projection face.

14. The video processing apparatus of claim 12, wherein there is an image discontinuity boundary between the first side of the first partial rectangular projection face and the second side of the second rectangular projection face, there is an image discontinuity boundary between the second side of the first partial rectangular projection face and the second side of the third rectangular projection face, there is an image discontinuity boundary between the first side of the third partial rectangular projection face and the third side of the third rectangular projection face, there is an image discontinuity boundary between the second side of the third partial rectangular projection face and the second side of the fourth rectangular projection face, there is an image discontinuity boundary between the first side of the fourth partial rectangular projection face and the third side of the fourth rectangular projection face, there is an image discontinuity boundary between the second side of the fourth partial rectangular projection face and the second side of the fifth rectangular projection face, there is an image discontinuity boundary between the first side of the second partial rectangular projection face and the third side of the second rectangular projection face, and there is an image discontinuity boundary between the second side of the second partial rectangular projection face and the third side of the fifth rectangular projection face.

15. The video processing apparatus of claim 11, wherein the conversion circuit is further arranged to map the omnidirectional image/video content of the viewing sphere onto square projection faces via a cubemap projection of the viewing sphere, and derive the first rectangular projection face, the second rectangular projection face, the third rectangular projection face, the fourth rectangular projection face, the fifth rectangular projection face, and the sixth rectangular projection face from the square projection faces, respectively, where each of the second rectangular projection face, the third rectangular projection face, the fourth rectangular projection face, the fifth rectangular projection face, and the sixth rectangular projection face is derived by down-scaling a corresponding square projection face.

16. The video processing apparatus of claim 15, wherein the conversion circuit directly uses a first square projection face as the first rectangular projection face, derives the second rectangular projection face by down-scaling a second square projection face in its height direction with a down-scaling factor, derives the third rectangular projection face by down-scaling a third square projection face in its width direction with the down-scaling factor, derives the fourth rectangular projection face by down-scaling a fourth square projection face in its height direction with the down-scaling factor, derives the fifth rectangular projection face by down-scaling a fifth square projection face in its width direction with the down-scaling factor, and derives the sixth rectangular projection face by down-scaling a sixth square projection face in its height direction with a second down-scaling factor and down-scaling the sixth square projection face in its width direction with the second down-scaling factor, where the first down-scaling factor is two times as large as the second down-scaling factor.

17. The video processing apparatus of claim 15, wherein the conversion circuit derives the first rectangular projection face by down-scaling a first square projection face in its height direction with a first down-scaling factor and down-scaling the first square projection face in its width direction with the first down-scaling factor, derives the second rectangular projection face by down-scaling a second square projection face in its height direction with a second down-scaling factor and down-scaling the second square projection face in its width direction with the first down-scaling factor, derives the third rectangular projection face by down-scaling a third square projection face in its height direction with the first down-scaling factor and down-scaling the third square projection face in its width direction with the second down-scaling factor, derives the fourth rectangular projection face by down-scaling a fourth square projection face in its height direction with the second down-scaling factor and down-scaling the fourth square projection face in its width direction with the first down-scaling factor, derives the fifth rectangular projection face by down-scaling a fifth square projection face in its height direction with the first down-scaling factor and down-scaling the fifth square projection face in its width direction with the second down-scaling factor, and derives the sixth rectangular projection face by down-scaling a sixth square projection face in its height direction with a third down-scaling factor and down-scaling the sixth square projection face in its width direction with the third down-scaling factor, where the second down-scaling factor is two times as large as the third down-scaling factor.

18. The video processing apparatus of claim 15, wherein a shape of the viewport-based cube projection layout is a square; a shape of the first rectangular projection face is a square; a shape of each of the second rectangular projection face, the third rectangular projection face, the fourth rectangular projection face, and the fifth rectangular projection face is not a square; and a shape of each of the partial rectangular projection faces is a square.

19. The video processing apparatus of claim 15, wherein the conversion circuits down-scales the corresponding square projection face by:
re-sampling the corresponding square projection face through non-uniform mapping, wherein the corresponding square projection face has a first source region and a second source region, said each of the second rectangular projection face, the third rectangular projection face, the fourth rectangular projection face, the fifth rectangular projection face, and the sixth rectangular projection face has a first down-scaled region and a second down-scaled region, the first down-scaled region is derived by re-sampling the first source region with a first sampling density, and the second down-scaled region is derived by re-sampling the second source region with a second sampling density that is different from the first sampling density.

20. The video processing apparatus of claim 19, wherein the first source region is closer to a center of the user's viewport than the second source region, and the first sampling density is higher than the second sampling density.

21. A video processing method comprising:
receiving a bitstream; and
decoding, by a video decoder, the bitstream to generate a decoded frame, wherein the decoded frame is a projection-based frame that has a 360-degree image/video content represented by rectangular projection faces packed in a viewport-based cube projection layout, the rectangular projection faces comprise a first rectangular projection face, a second rectangular projection face, a third rectangular projection face, a fourth rectangular projection face, a fifth rectangular projection face and a sixth rectangular projection face that is split into partial rectangular projection faces, a shape of the projection-based frame having the rectangular projection faces packed therein is a rectangle, and within the projection-based frame that has the rectangular projection faces packed therein, the first rectangular projection face corresponds to a user's viewport and is enclosed by a surrounding area composed of the second rectangular projection face, the third rectangular projection face, the fourth rectangular projection face, the fifth rectangular projection face, and the partial rectangular projection faces that are located at four corners of the projection-based frame respectively.

22. A video processing apparatus comprising:
a video decoder, arranged to receive a bitstream, and decode the bitstream to generate a decoded frame;
wherein the decoded frame is a projection-based frame that has a 360-degree image/video content represented by rectangular projection faces packed in a viewport-based cube projection layout, the rectangular projection faces comprise a first rectangular projection face, a second rectangular projection face, a third rectangular projection face, a fourth rectangular projection face, a fifth rectangular projection face and a sixth rectangular projection face that is split into partial rectangular projection faces, a shape of the projection-based frame having the rectangular projection faces packed therein is a rectangle, and within the projection-based frame that has the rectangular projection faces packed therein, the first rectangular projection face corresponds to a user's viewport and is enclosed by a surrounding area composed of the second rectangular projection face, the third rectangular projection face, the fourth rectangular projection face, the fifth rectangular projection face, and the partial rectangular projection faces that are located at four corners of the projection-based frame respectively.

* * * * *